United States Patent
Nakamura et al.

(10) Patent No.: US 8,376,436 B2
(45) Date of Patent: Feb. 19, 2013

(54) STORAGE BOX ASSEMBLY FOR VEHICLE

(75) Inventors: Tatsuhiko Nakamura, Fujinomiya (JP);
Kenichi Kamio, Fujinomiya (JP);
Yasunori Sei, Fujinomiya (JP); Chihiro Mochizuki, Fujinomiya (JP)

(73) Assignee: Nihon Plast Co., Ltd., Fujinomiya-shi (JP)

( * ) Notice: Subject to any disclaimer, the term of this patent is extended or adjusted under 35 U.S.C. 154(b) by 219 days.

(21) Appl. No.: 12/869,382

(22) Filed: Aug. 26, 2010

(65) Prior Publication Data

US 2011/0049157 A1 Mar. 3, 2011

(30) Foreign Application Priority Data

Aug. 27, 2009 (JP) ............................ 2009-196870
Apr. 23, 2010 (JP) ............................ 2010-99968
Jun. 29, 2010 (JP) ............................ 2010-147705

(51) Int. Cl.
*B60R 7/04* (2006.01)

(52) U.S. Cl. .................. 296/24.34; 220/345.1

(58) Field of Classification Search ............ 296/24.34, 296/37.8, 37.1, 37.12, 37.14, 37.16; 312/297; 220/345.1, 345.3, 350; 224/926

See application file for complete search history.

(56) References Cited

U.S. PATENT DOCUMENTS

| | | | | |
|---|---|---|---|---|
| 6,478,204 B2 * | 11/2002 | Lange et al. | ............... | 220/345.1 |
| 6,499,785 B2 * | 12/2002 | Eguchi | ......................... | 296/37.8 |
| 6,672,554 B2 | 1/2004 | Fukuo | | |
| 7,287,795 B1 * | 10/2007 | Thomas | ..................... | 296/24.34 |
| 7,341,297 B2 * | 3/2008 | Nakamura et al. | ......... | 296/24.34 |
| 7,475,954 B1 * | 1/2009 | Latunski | ....................... | 312/297 |
| 7,721,926 B2 * | 5/2010 | Thomas | ..................... | 220/345.3 |
| 7,735,538 B2 * | 6/2010 | Ogawa | ....................... | 296/24.34 |

FOREIGN PATENT DOCUMENTS

JP 2003-020851 A 1/2003

* cited by examiner

*Primary Examiner* — Andrew Perreault
(74) *Attorney, Agent, or Firm* — Marvin A. Motsenbocker; Mots Law, PLLC

(57) ABSTRACT

A storage box assembly for a vehicle includes a case in which an opening is formed on an upper surface thereof, and a lid for opening/closing the opening. When the lid is closed, a surface of the lid and an upper surface of the case substantially form a flush surface. When the lid is opened, the lid is moved to be retracted in the case by a guide mechanism.

1 Claim, 20 Drawing Sheets

FIG.21
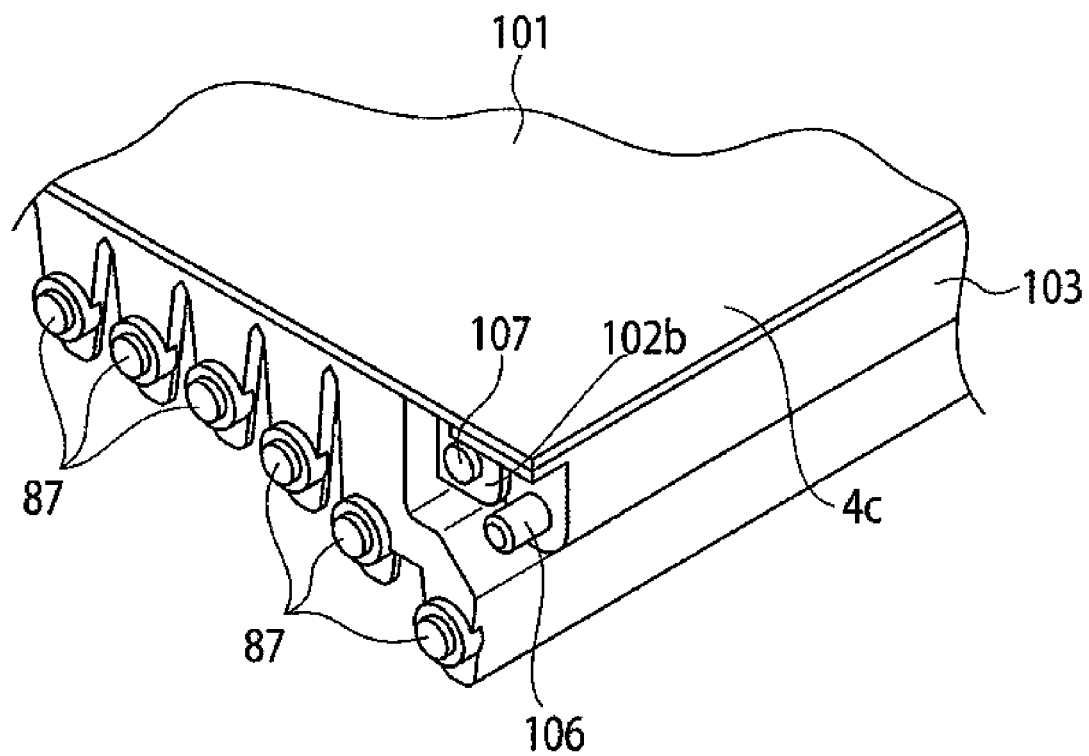
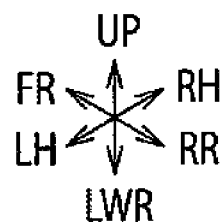

STORAGE BOX ASSEMBLY FOR VEHICLE

BACKGROUND

1. Field

The present invention relates to a storage box assembly for a vehicle such as an automobile, a train, aircraft and a ship.

2. Description of Related Art

As a conventional storage box for a vehicle, especially for an automobile, known is one that is disclosed in Japanese Patent Application Laid-Open No. 2003-020851. The storage box includes a case with an internal space for storing items, and a lid for opening/closing an upper opening of the case is attached to it. The lid slides along rails provided on the case.

SUMMARY

However, since the rails for guiding the lid are provided on the case in the above storage box, the rails are arranged slightly downward from an upper surface of the case. Therefore, the lid is arranged slightly downward from the upper surface of the case. Namely, a portion of the lid forms a depressed space on the upper surface of the case.

An object of the present invention is to provide a storage box assembly for a vehicle in which an upper surface of a case and a surface of a lid form a flush surface and the lid is internally retracted when the lid is opened.

An aspect of the present invention provides a storage box assembly for a vehicle that includes: a case in which an opening is formed on an upper surface thereof; and a slidable lid provided on the case for opening/closing the opening. Here, a surface of the lid and the upper surface of the case form a flush surface in a state where the lid is closed. In addition, the lid is moved to be retracted in the case by a guide mechanism when the lid is opened.

BRIEF DESCRIPTION OF DRAWINGS

FIG. 21 is a partially enlarged cross-sectional view after a lid is assembled;

DETAILED DESCRIPTION OF EMBODIMENTS

Hereinafter, embodiments will be explained with reference to the drawings.

First Embodiment

A first embodiment will be explained with reference to FIG. 1 to FIG. 7. A storage box assembly 1 for an automobile according to the first embodiment is a so-called console box and provided behind a not-shown instrument panel, on a not-shown floor, and between not-shown two seats. The console box is used for storing items (for example, music media such as CD's or MD's, tissue papers, tickets and so on) of occupants seated on the seats.

Figure 1:
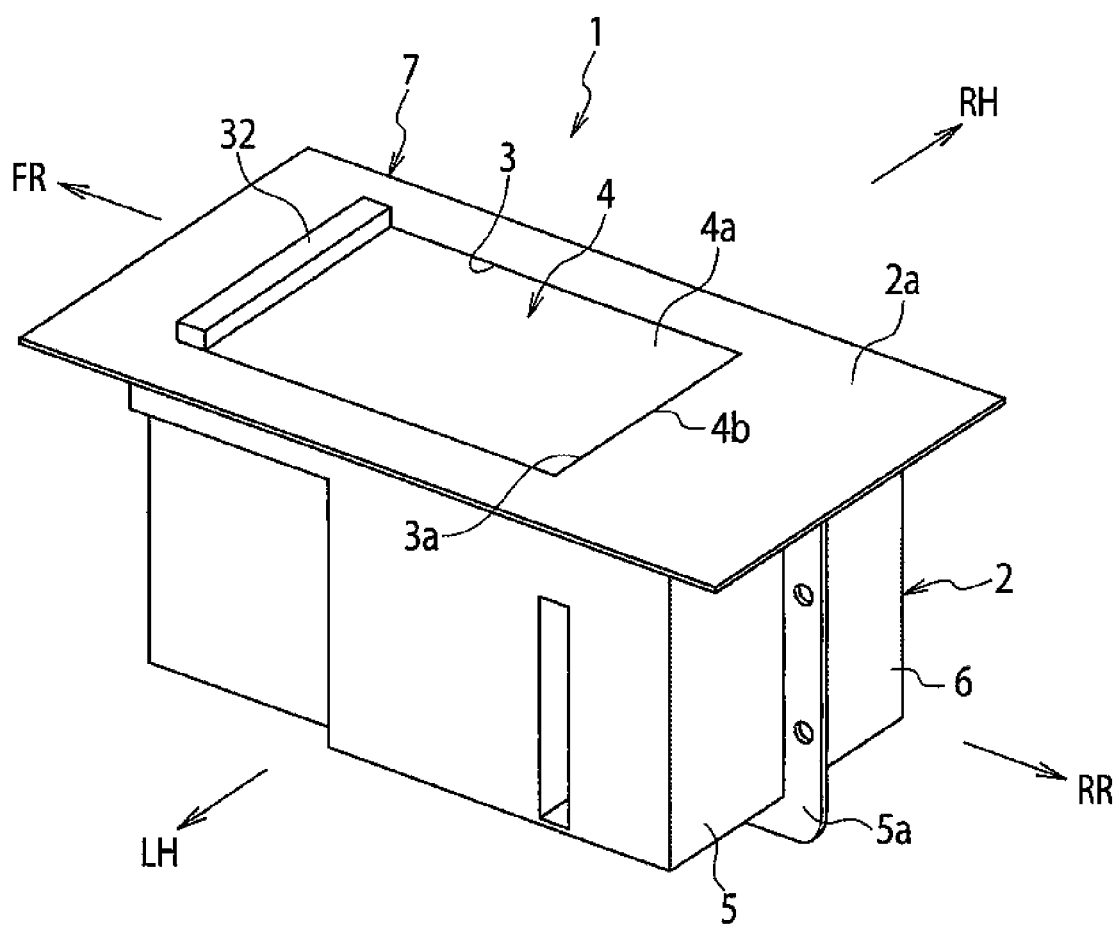
FIG. 1 is a perspective view of a storage box assembly according to a first embodiment when a lid is closed.
Figure 2:
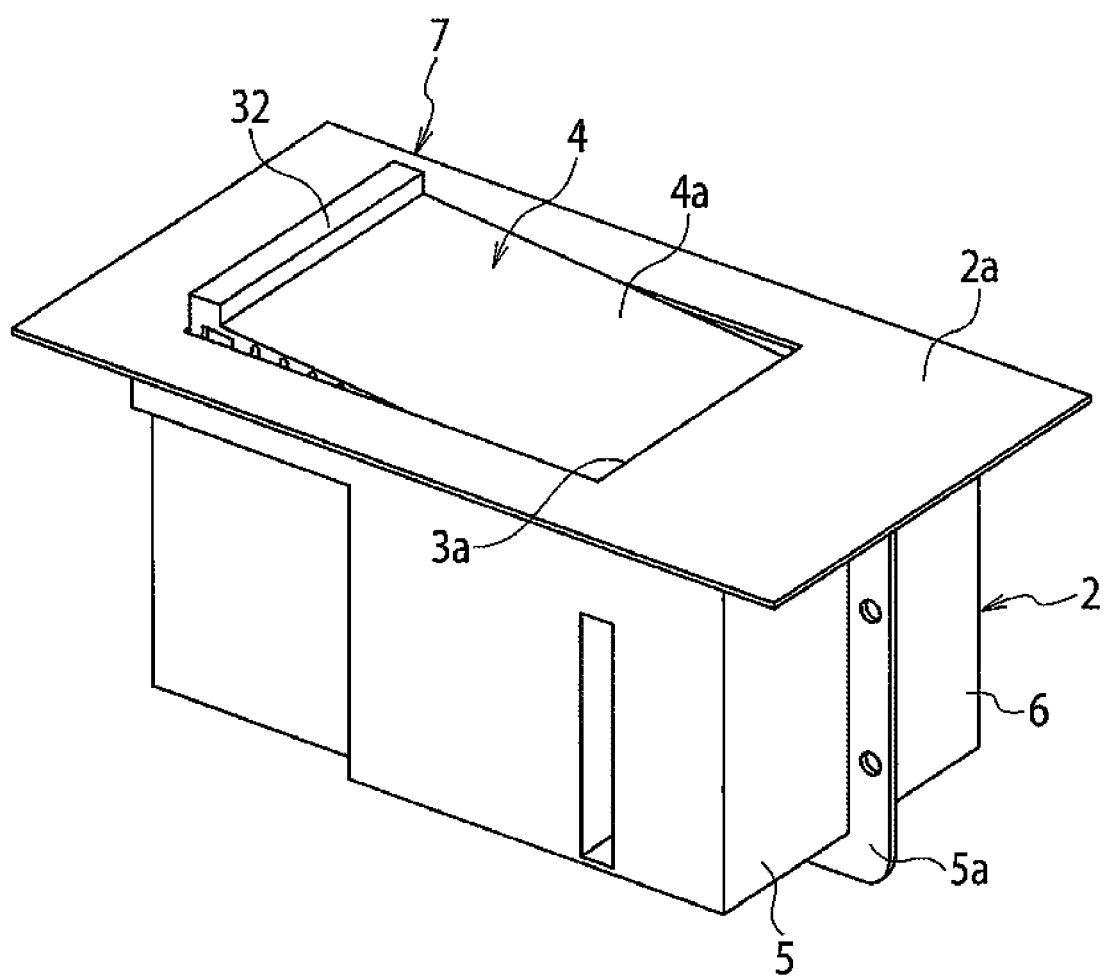
FIG. 2 is a perspective view showing a state where a part of the lid is pressed downward.
Figure 3:
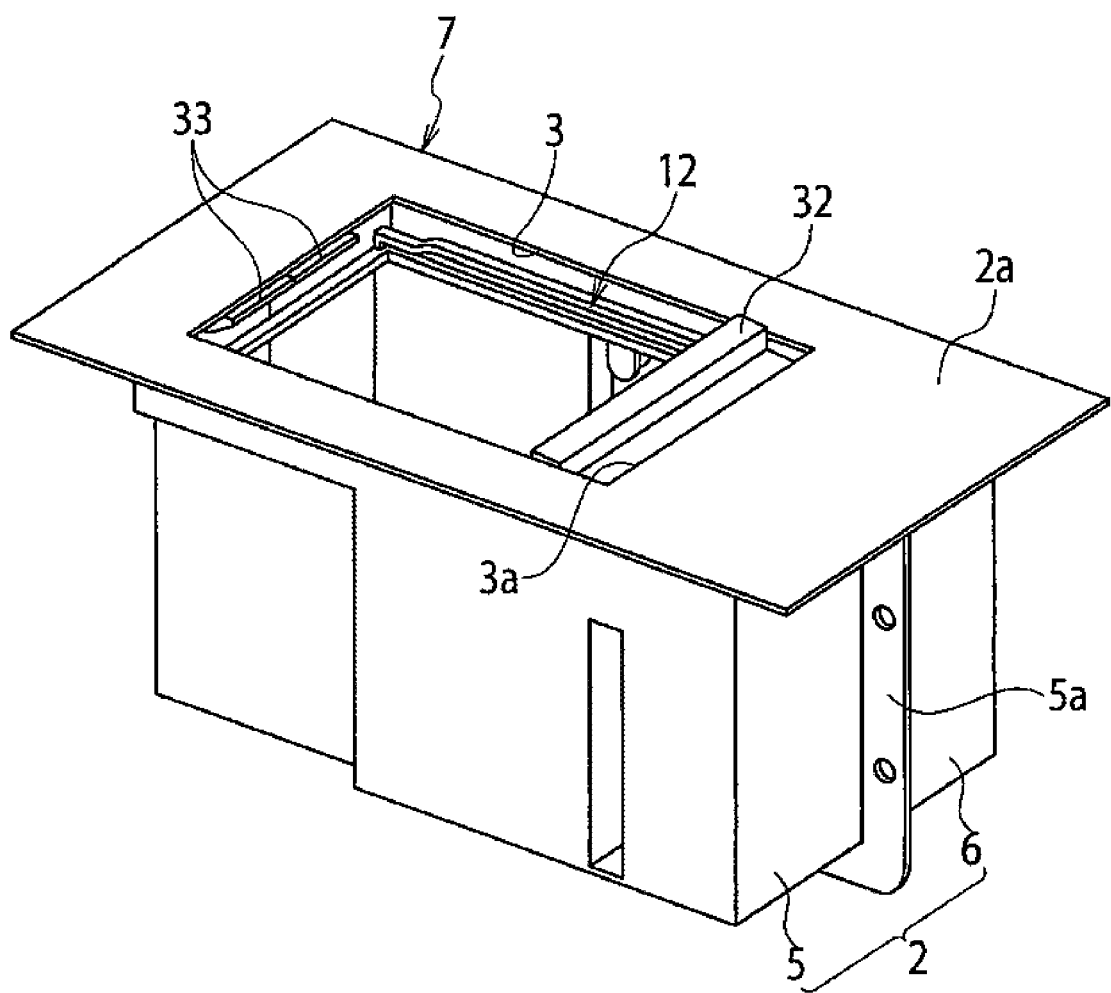
FIG. 3 is a perspective view showing a state where the lid is fully opened.

The box assembly 1 includes a case 2 in which an opening 3 is formed on its upper surface 2a, and a lid 4 that opens/closes the opening 3 of the case 2. When the lid 4 is closed as shown in FIG. 1, its surface 4a and the upper surface 2a of the case 2 substantially form a flush surface. When the lid 4 is opened as shown in FIG. 3, almost entire of the lid 4 is retracted in the case 2 by a guide mechanism. The lid 4 is retracted on a side of an opening edge 3a of the opening 3. As shown in FIG. 1, indicated are a vehicle forward direction as FR, a vehicle backward direction as RR, a vehicle rightward direction as RH, and a vehicle leftward direction as LH (similarly in other drawings).

Figure 4:
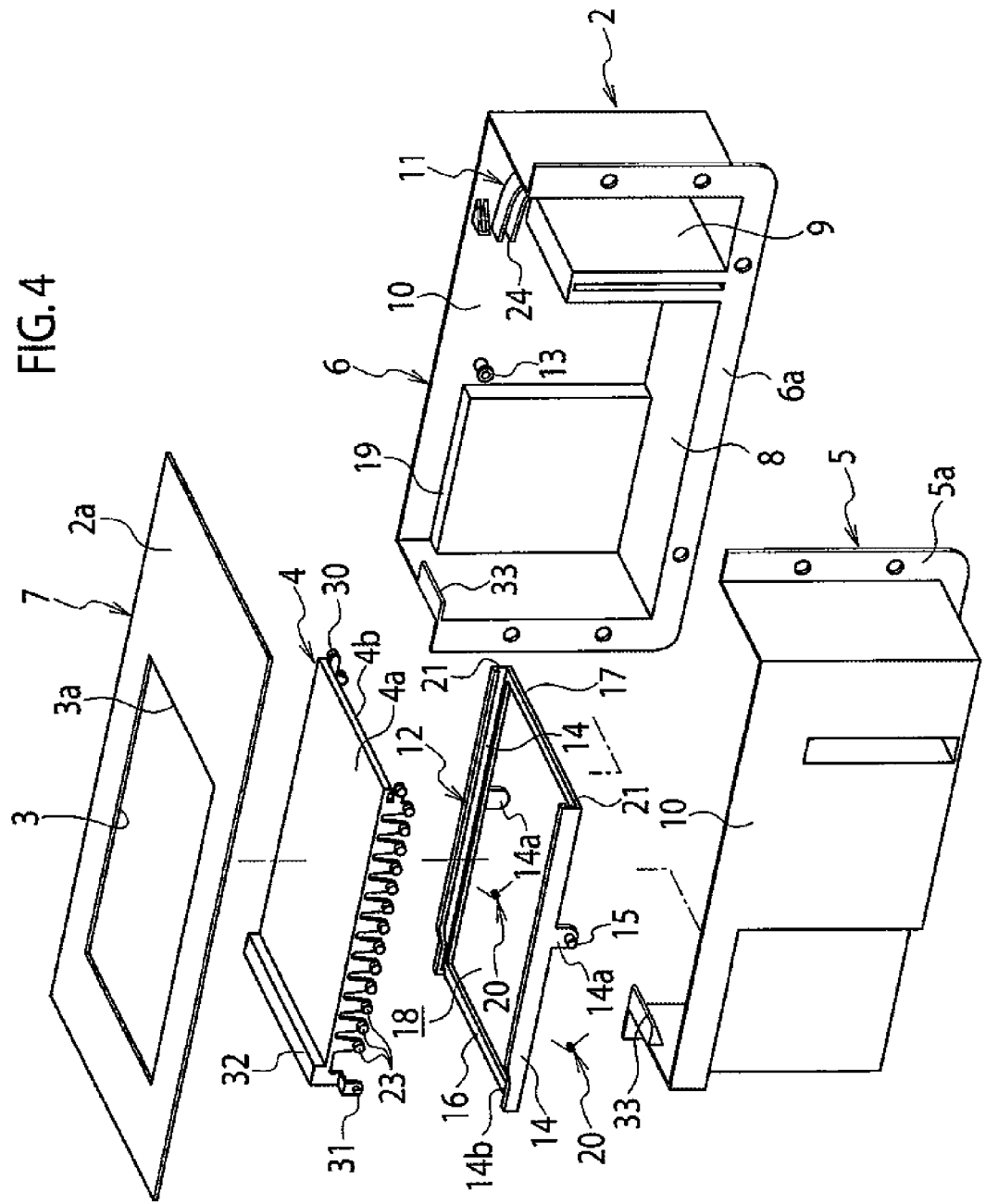
FIG. 4 is an exploded perspective view of the assembly.
Figure 5:
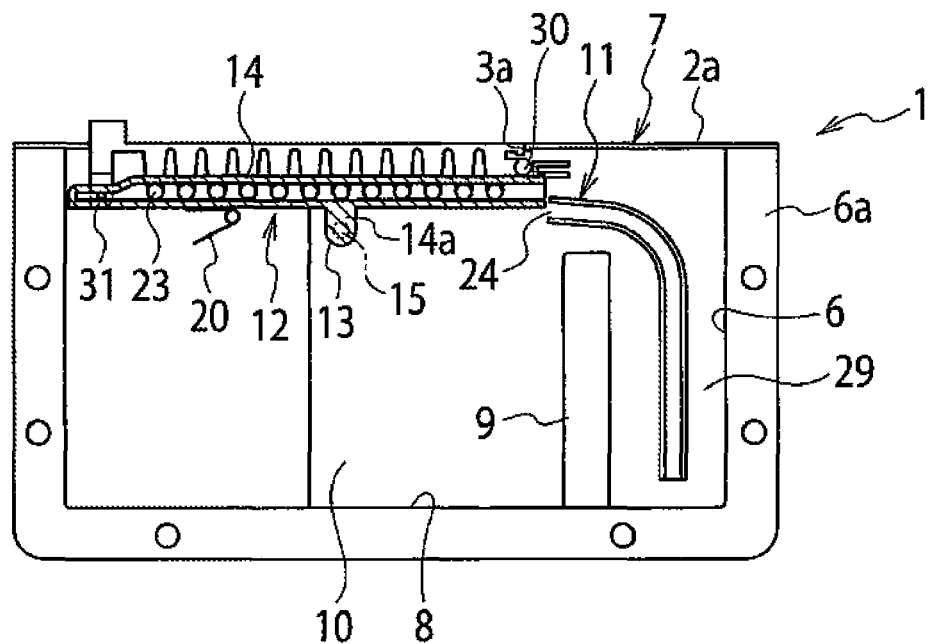
FIG. 5 is a cross-sectional view showing a state where open ends of first and second rails of a guide rail are not aligned.
Figure 6:
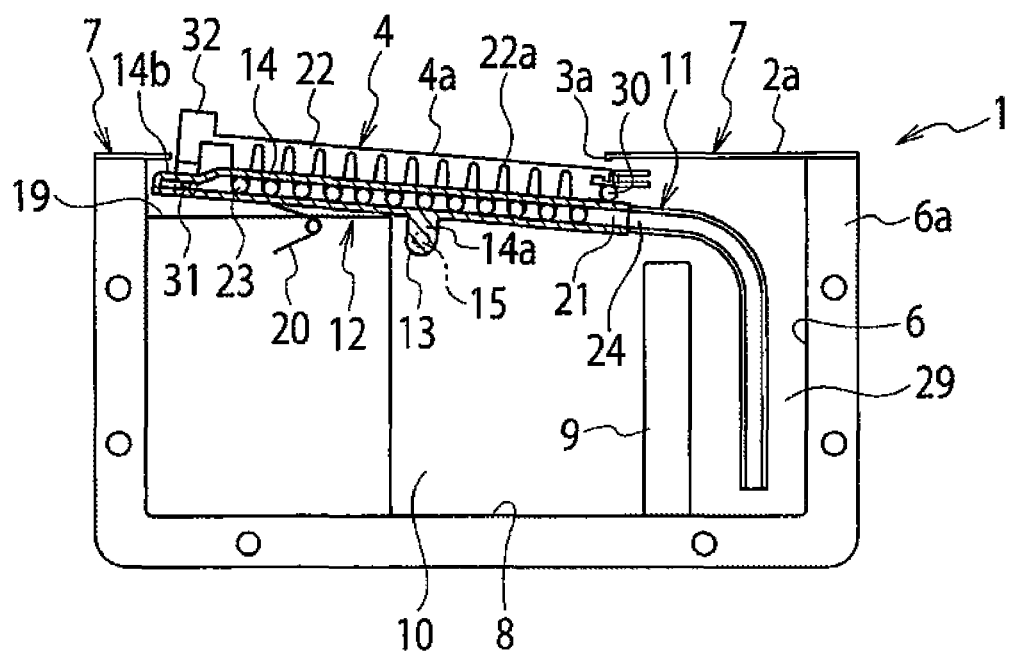
FIG. 6 is a cross-sectional view showing a state where the open ends of the first and second rails are aligned.
Figure 7:
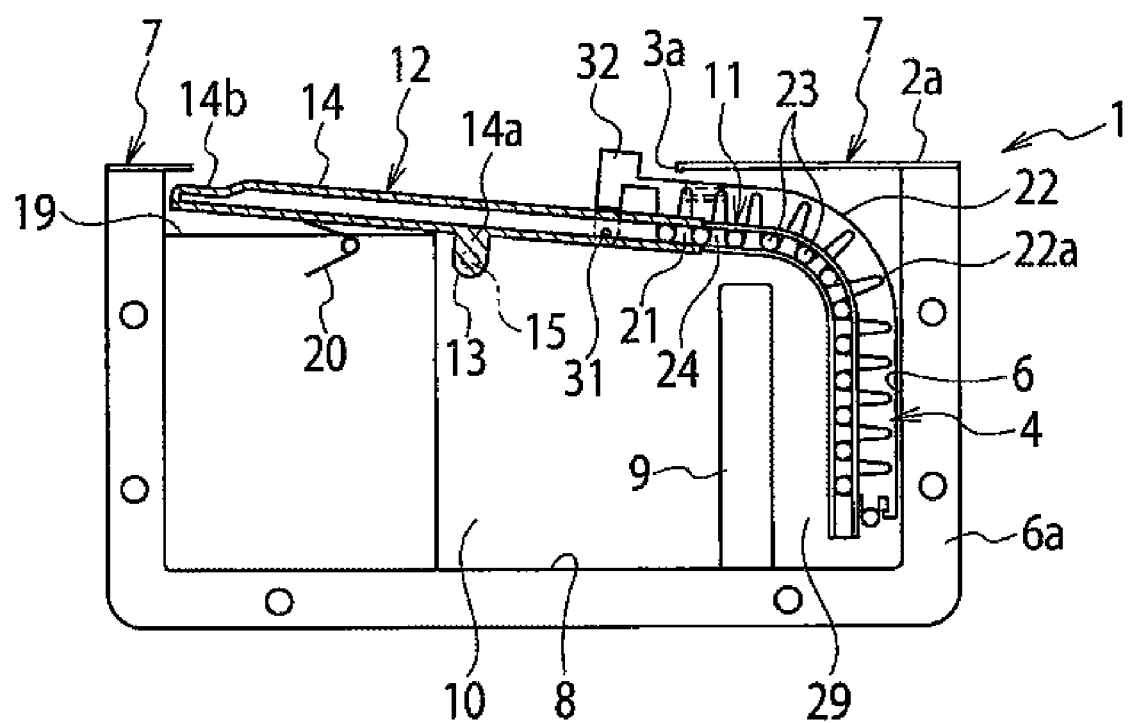
FIG. 7 is a cross-sectional view showing a state where the lid is retracted in a case.

As shown in FIG. 4, the case 2 is constructed by a left member 5 and a right member 6. The left member 5 and the right member 6 are combined each other at their flanges 5a and 6a. A plate 7 on which the opening 3 is formed is attached to an upper portion of the combined left and right member 5 and 6. A bottom plate 8 is formed at a lower portion of the case 2. A partition 9 is built from the bottom plate 8. The partition 9 divides an inside of the case 2 into front and rear spaces, and protects an after-mentioned second rail 11 from the stored items. The left member 5 and the right member 6 are formed symmetrically, and explanations with FIG. 5 to FIG. 7 are made with reference to a side of the right member 6.

Next, the guide mechanism for guiding opening/closing (sliding) of the lid 4 will be explained. Components of the guide mechanism are explained hereinafter.

Bushes 13 are provided on inner surfaces of a pair of side panel 10 of the case 2, respectively. Though the bush 13 on the left member 5 is not visible in FIG. 4 due to the side panel 10 of the left member 5, a pair of the bushes 13 is provided symmetrically. Pins 15 are rotatably inserted into the bushes 13, respectively. The pins 15 are projected outward from brackets 14a extending downward from almost longitudinal centers of a pair of first rails 14 of guide rail 12, respectively. Though the right pin 15 is not visible in FIG. 4 due to the bracket 14a, a pair of the pins 15 is provided symmetrically. The guide rail 12 is composed of a pair of linear first rails 14 and liner end bars 16 and 17 each bridges front or rear ends of the pair of first rails 14. A center rectangular hole 18 is formed inside the pair of first rails 14 and the end bars 16 and 17. Each of the first rails 14 has an almost C-shaped cross-sectional shape, and its RR-side end is formed as a first open end 21.

Pedestals 19 projected inward are formed in the vicinities of the bushes 13 on the inner surface of the side panels 10, respectively. Though the pedestal 19 on the side panel 10 of the left member 5 is not visible in FIG. 4 due to the side panel 10 of the left member 5, a pair of the pedestals 19 is provided symmetrically. Coiled torsion springs 20 are provided between the pedestals 19 and the first rails 14 of the guide rail 12, respectively. As shown in FIG. 5 to FIG. 7, a pair of the coiled torsion springs 20 always urges the first rails 14 upward. Namely, an FR side of the guide rail 12 is always urged upward centering about the pair of pins 15. A tab 33 is provided at an FR-side end of the combined left and right member 5 and 6, which supports the guide rail 12 (the end bar 16) from underneath.

In addition, the lid 4 is composed of plural lid pieces 22 (see FIG. 6) aligned parallel, plural guide pins 23 and stopper pins 30. The plural lid pieces 22 are connected each other via hinges 22a, and the lid 4 is configured to be able to change its shape from a planar shape (FIG. 5 and FIG. 6) to a curved shape (FIG. 7) along the guide rails 14. The hinges 22a functions as elastic hinges, but may be made thin so as to be easily bent. The guide pins 23 are formed at both ends of each of the lid pieces 22. Each of the guide pins 23 is provided on a lower end of a tab extending downward from the ends of the lid piece 22. A pair of the guide pins 23 of each of the lid piece 22 is projected outward in a vehicle lateral direction, and is slidably supported by the first rails 14. In the present embodiment, the thirteen guide pins 23 are provided at each side.

As shown in FIG. 5, the stopper pins 30 contacts with stoppers on the case 2 while the lid 4 is closed so as to keep the lid 4 in a locked state (locked state), even when a longitudinal force is applied to the lid 4 due to acceleration and deceleration of the vehicle or the like. On the other hand, the lid 4 is made slidable when the locked state is released by an after-mentioned operation. A pair of hold pins 31 provided at both ends of a front edge of the lid 4 is held within slits 14b formed at front ends of the first rails 14. The pair of hold pins 31 can be detached from the slits 14b by an upward unlock operation of a knob 32 formed on a front edge of the upper surface 4a of the lid 4.

As shown in FIG. 5 to FIG. 7, the second rail 11 is provided with being curved so as to change its path from a horizontal direction to a vertical direction. A second open end 24 of the second rail 11 is located outside of a segmented space 29 partitioned by the partition 9. The guide pins 23 can be moved from the first open end 21 of the first rail 14 to the second open end 24 as explained later.

The guide rail 12 is swung about the pair of pins 15 inserted into the pair of bushes 13 so as to connect the first open ends 21 and the second open ends 24, when opened from its closed state (FIG. 1 and FIG. 5) to its opened state (FIG. 3 and FIG. 7). As a result, the pair of the first open ends 21 and the pair of the second open ends 24 forms continuous guide paths, respectively.

According to the above configuration, the upper surface 2a of the case 2 and the surface 4a of the lid 4 substantially form a flush surface when the opening 3 of the case 2 is closed by the lid 4.

In addition, since the lid 4 is configured so as to be curved along the guide rail 12 (the first rails 14 and the second rails 11), the lid 4 can be easily retracted in the case 2.

Further, when the lid 4 is slid form its closed state to its opened state, the guide rail 12 is swung so as to make the first open ends 21 and the second open ends 24 continuously connected. As a result, the continuous guide paths are formed by the first rails 14 and the second rails 11, and the lid 4 is slid along the (curved) guide paths via the guide pins 23 to be retracted in the segmented space 29. Since the stored items do not enter the segmented space 29, the items are not affected by the slide of the lid 4 and the lid 4 can be slid unfailingly without being affected by the items. In addition, lock and unlock operations of the lid 4 can be done with the knob 32.

Second Embodiment

Figure 9:
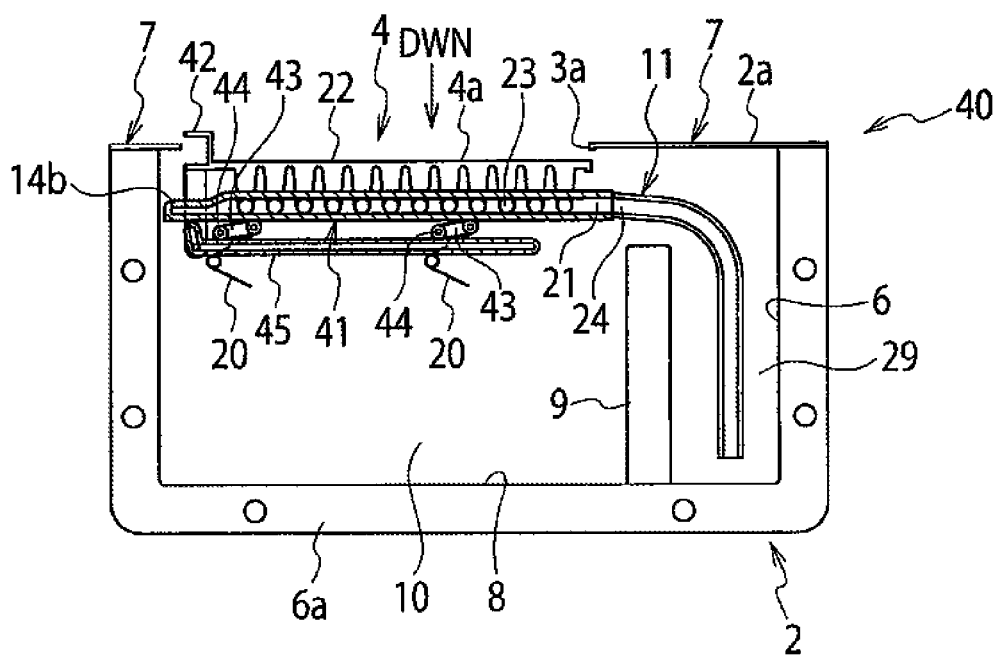
FIG. 9 is a cross-sectional view showing a state where open ends of first and second rails are aligned.
Figure 10:
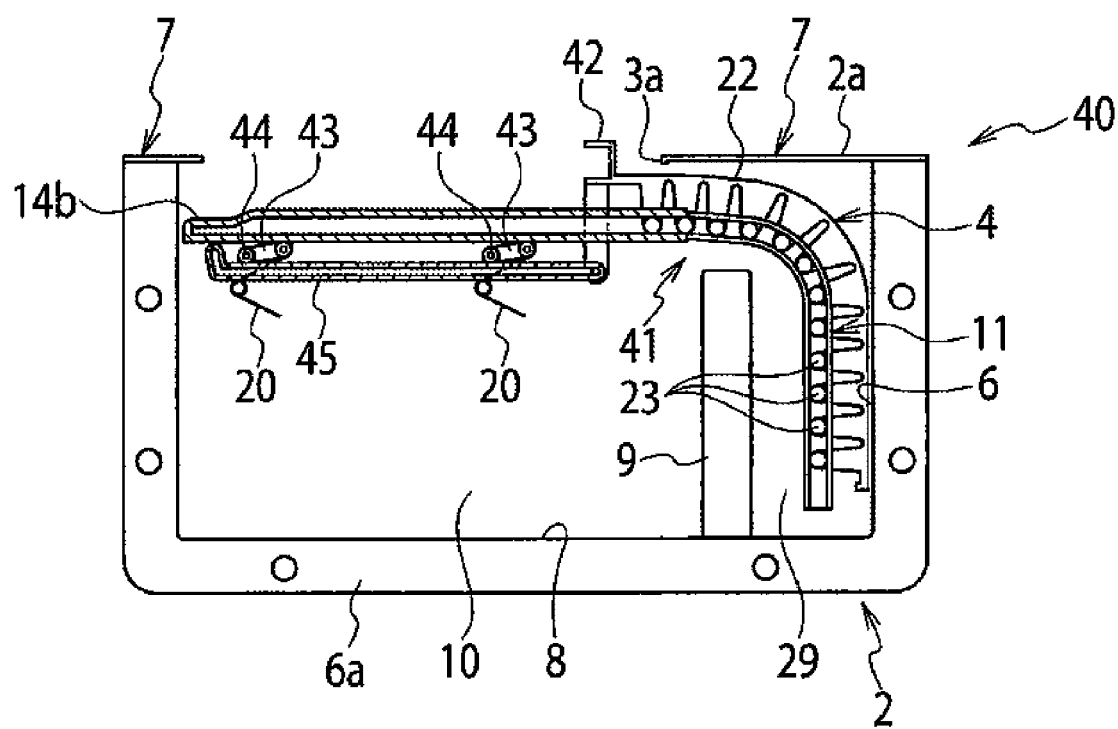
FIG. 10 is a cross-sectional view showing a state where the lid is retracted in a case.

A second embodiment will be explained with reference to FIG. 8 to FIG. 10. Since a case 2, an opening 3, a lid 4, and a second rail 14 in a box assembly 40 in the second embodiment are the same as those in the first embodiment, their redundant explanations are abbreviated.

Figure 8:
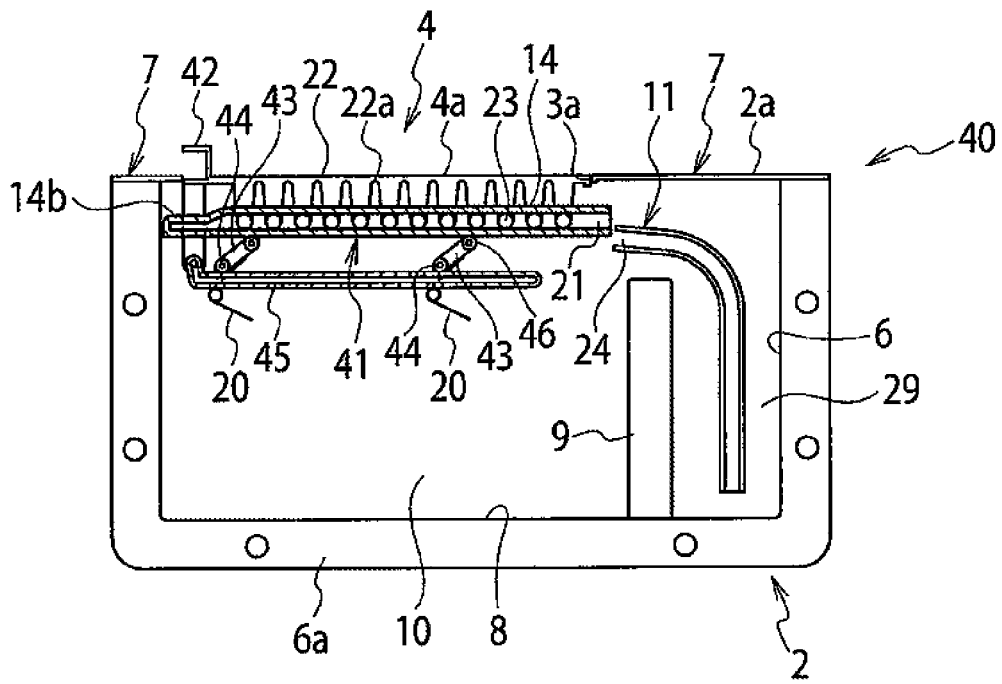
FIG. 8 is a cross-sectional view showing a relationship between a guide rail and a lid in a storage box assembly according to a second embodiment.

As shown in FIG. 8, the box assembly 40 in the second embodiment includes a guide rail 41 of a guide mechanism. When the lid 4 is opened, the guide rail 41 is being pushed up by the coiled torsion springs 20, so that the lid 4 is pushed up to a position where the surface 4a of the lid 4 and the upper surface 2a of the case 2 (the plate 7) forms a flush surface. When the lid 4 is slid to its open position, the guide rail 41 is moved parallel in a downward direction DWN against elastic forces of the coiled torsion springs 20 as shown in FIG. 9. RR-side ends of the first rail 14 are formed as the first open ends 21. When the lid 4 is opened from its closed state (FIG. 8) to its opened state (FIG. 10), the guide rail 41 is firstly moved parallel by being pressed from above so as to connect the first open ends 21 and the second open ends 24 continuously (FIG. 9).

A pair of intercalated arms 43 swingably pivoted by pins 44 is provided on the side panel 10 of the case 2. Namely, a lower end of each of the intercalated arms 43 is pivoted to the pin 44. An upper end of each of the intercalated arms 43 is pivoted to a pin 46. Each of the intercalated arms 43 is contacted with an upper portion of the coiled torsion spring 20. A lower portion of the coiled torsion spring 20 is supported by the pedestal 19 (see the first embodiment). The elastic forces of the coiled torsion springs 20 are applied to the lid 4 via the intercalated arms 43. A slot 45 is extended on the side panel 10 under the pair of pins 44. The slot 45 is coupled with a knob 42 to guide movement (sliding) of the knob 42. Note that each of the intercalated arms 43 is provided at an inner side of the case 2 from the slot 45, and is offset to the slot 45 when viewed from above.

According to the above configuration, when the lid 4 (the knob 42) is pushed downward, the guide rail 41 is moved parallel in the downward direction DWN by the guide mechanism composed of the pair of intercalated arms 43 and the guide rail 41. As a result, the first open ends 21 are moved to positions for continuous connection (coincident positions) with the second open ends 24, the guide pins 23 can be moved from the first rails 14 to the second rails 11. The lid 4 is slid along the first rails 14 and the second rails 11 (the guide paths) to be retracted in the segmented space 29. Since the stored items do not enter the segmented space 29, the items are not affected by the slide of the lid 4 and the lid 4 can be slid unfailingly without being affected by the items. In addition, lock and unlock operations of the lid 4 can be done with the knob 42.

Third Embodiment

A third embodiment will be explained with reference to FIG. 11 to FIG. 13. Since a case 2, an opening 3, and a lid 4 in a box assembly 50 in the third embodiment are the same as those in the first embodiment, their redundant explanations are abbreviated.

Figure 11:
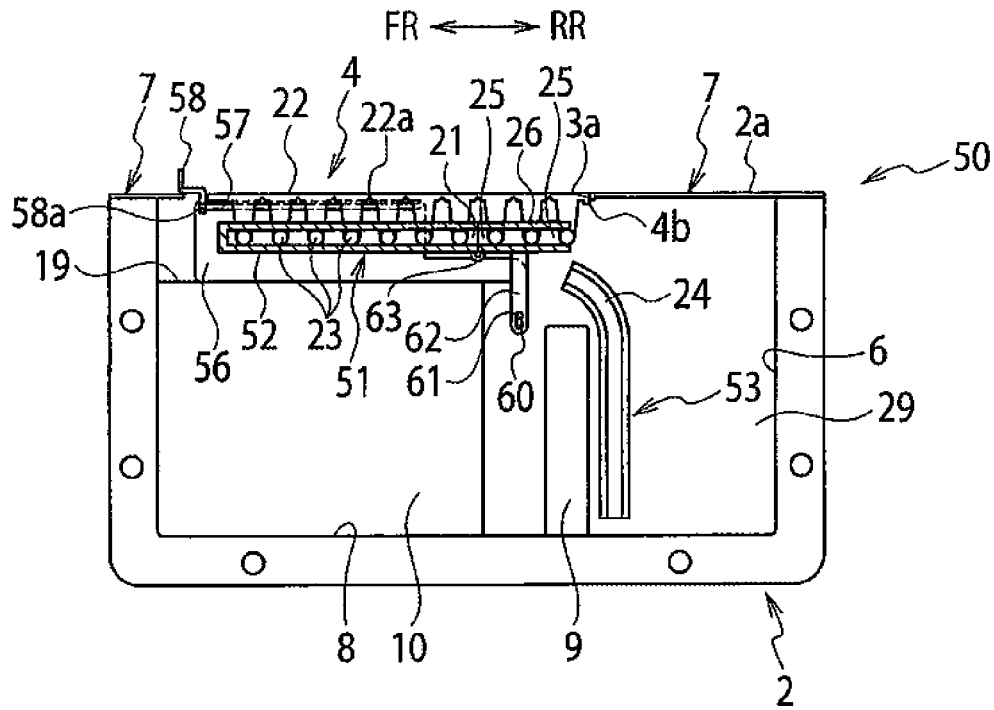
FIG. 11 is a cross-sectional view showing a relationship between a guide rail and a lid in a storage box assembly according to a third embodiment.
Figure 12:
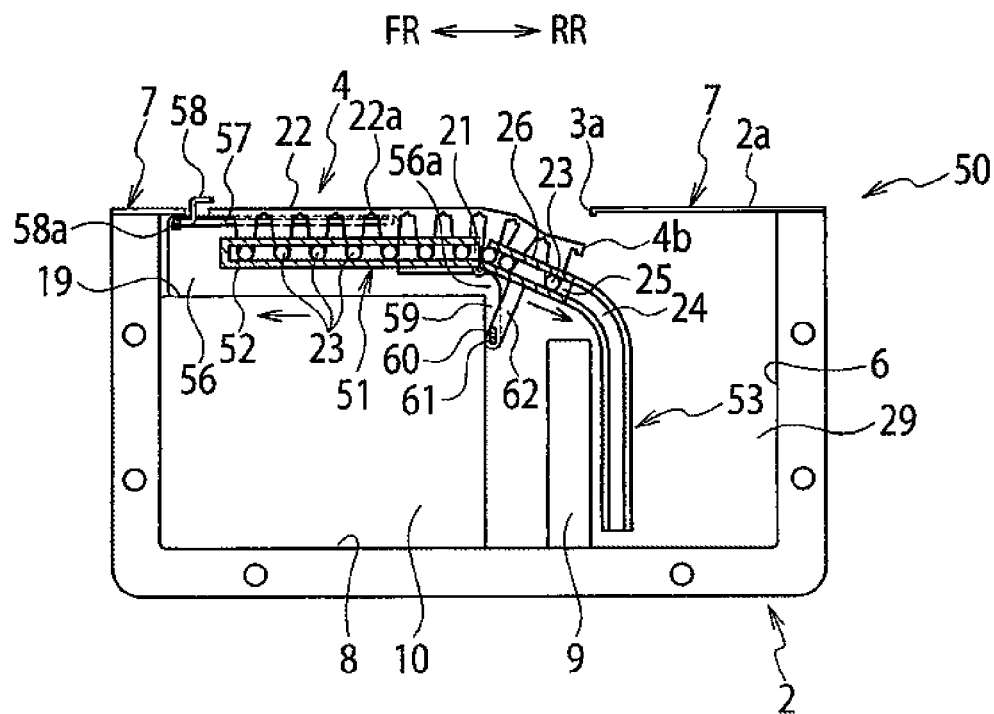
FIG. 12 is a cross-sectional view showing a state where open ends of first and second rails of are aligned.

As shown in FIG. 11, the box assembly 50 in the third embodiment includes a guide rail 51 of a guide mechanism. When the lid 4 is closed (FIG. 11), an edge 4b of the lid 4 is latched with the opening edge 3a of the case 2. The guide rail 51 is composed of first rails 52, second rails 53, and third rails 26. The first rail 52 arranged at the most FR side is provided with being fixed horizontally, and its RR-side end is formed as the first open end 21. The second rail 53 arranged at the most RR side is provided with being curved so as to change its path from a horizontal direction to a vertical direction, and its FR-side end is formed as the second open end 24. Both ends of the third rail 26 arranged at the center are formed as third open ends 25. The FR-side third open end 25 is always connected with the first open end 21. The third rail 26 can be swung about a hinge axis 63 provided at the FR-side third open end 25. Along with the swing of the third rail 26, the RR-side third open end 25 can change its position.

A panel 56 is slidably provided on the pedestal 19 formed on the side panel 10. A slot 57 is formed on an upper edge of the panel 57 in a longitudinal direction. A pin 58a provided on a knob 58 slides within the slot 57 to guide movement (sliding) of the knob 58. A bracket 59 (see FIG. 12) is extended downward from a rear end 56a of the panel 56. An elongate hole 60 is formed at a lower end of the bracket 59. A bracket 62 is also extended downward form the center of the third rail 26. A pin 61 is formed on a lower end of the bracket 62. The pin 61 is inserted into the elongate hole 60.

When the knob 58 is folded down to the RR side centering about the pin 58a in the closed state (FIG. 11) of the lid 4, the panel 56 is slid slightly to the FR direction via the pin 58a. Obviously, the bracket 59 of the panel 56 is also slid slightly to the FR direction. As a result, the lower end of the bracket 63 of the third rail 26 is slid slightly to the FR direction. Since the FR-side third open end 25 of the third rail 26 is pivoted at the hinge axis 63, the third rail 26 is swung about the hinge axis 63 (FIG. 12). Due to the swing of the third rail 26, the RR-side third open end 25 of the third rail 26 is connected to the second open end 24 of the second rail 53. Concurrently, the edge 4a of the lid 4 is moved downward via the guide pins 23. Note that the connected position of the third open end 25 and the second open end 24 is determined by contingence between the bracket 59 and a vertical surface of the pedestal 19.

Figure 13:
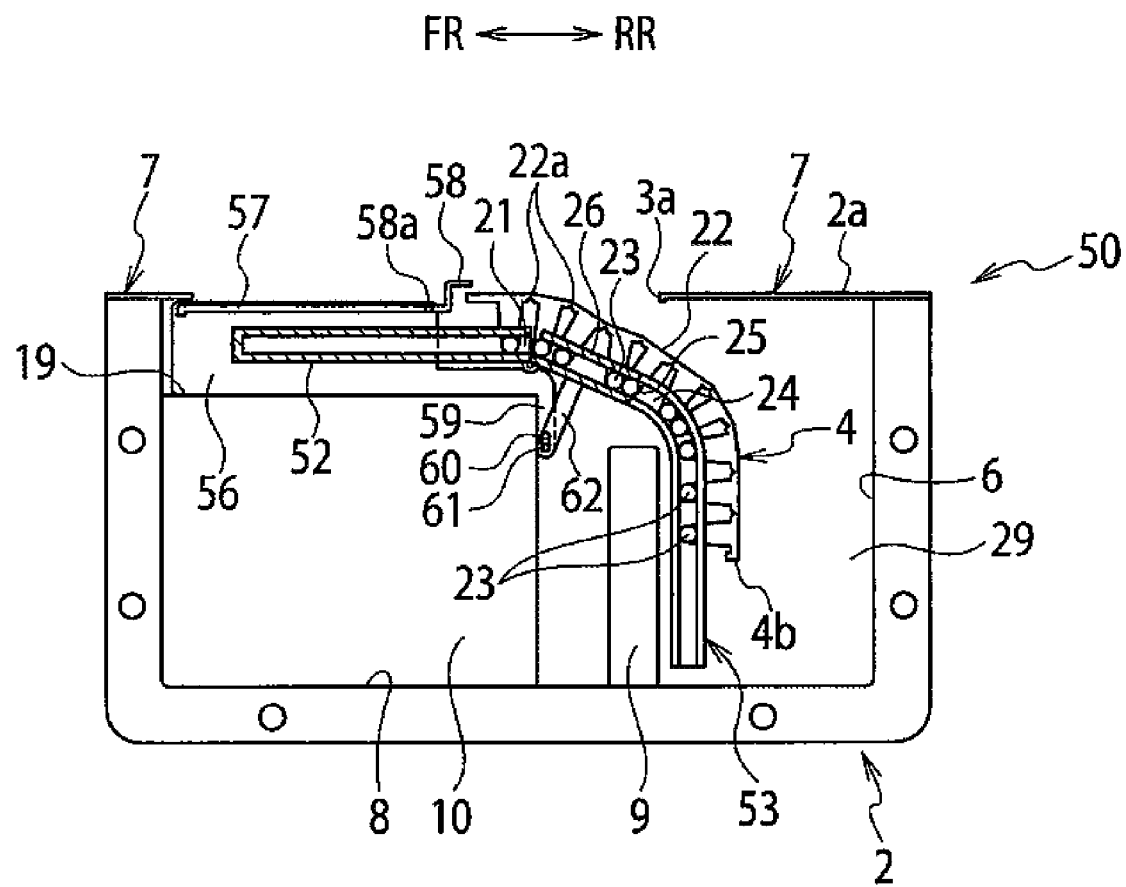
FIG. 13 is a cross-sectional view showing a state where the lid is retracted in a case.

Then, the lid 4 is slid along the first rails 52, the third rails 26 and the second rails 53 (the guide paths) through the operation of the knob 58 to be retracted in the segmented space 29 (FIG. 13). Since the stored items do not enter the segmented space 29, the items are not affected by the slide of the lid 4 and the lid 4 can be slid unfailingly without being affected by the items. In addition, lock and unlock operations of the lid 4 can be done with the knob 58.

Fourth Embodiment

A fourth embodiment will be explained with reference to FIG. 14 to FIG. 16. Since a case 2, an opening 3, and a lid 4 in a box assembly 70 in the fourth embodiment are the same as those in the first embodiment, their redundant explanations are abbreviated.

Figure 14:
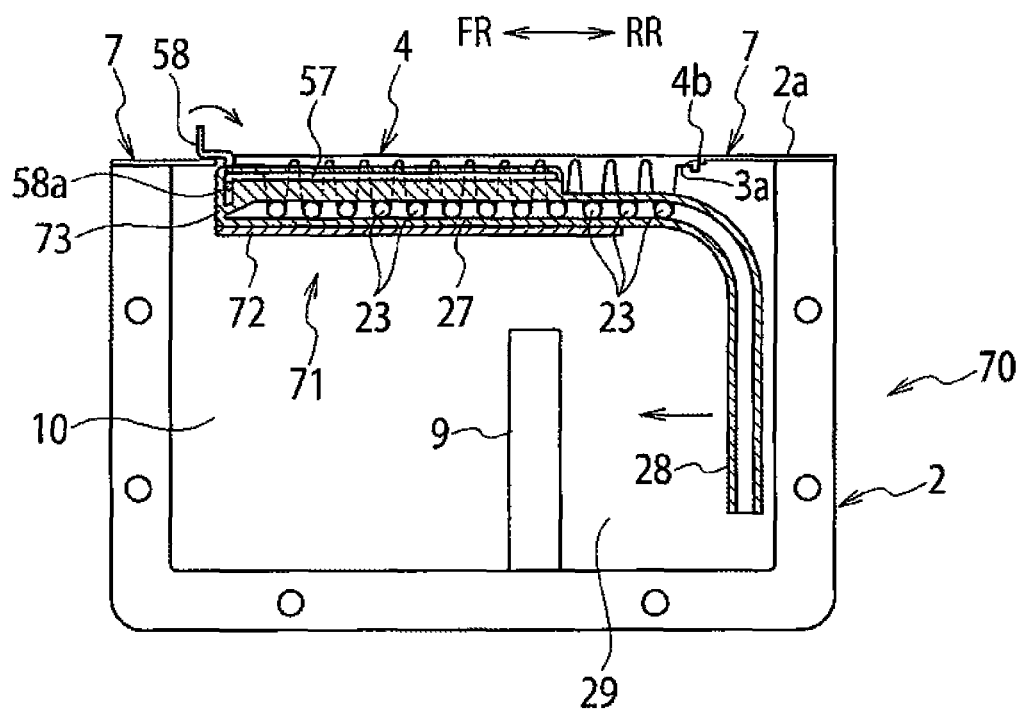
FIG. 14 is a cross-sectional view showing a relationship between a guide rail and a lid in a storage box assembly according to a fourth embodiment.
Figure 15:
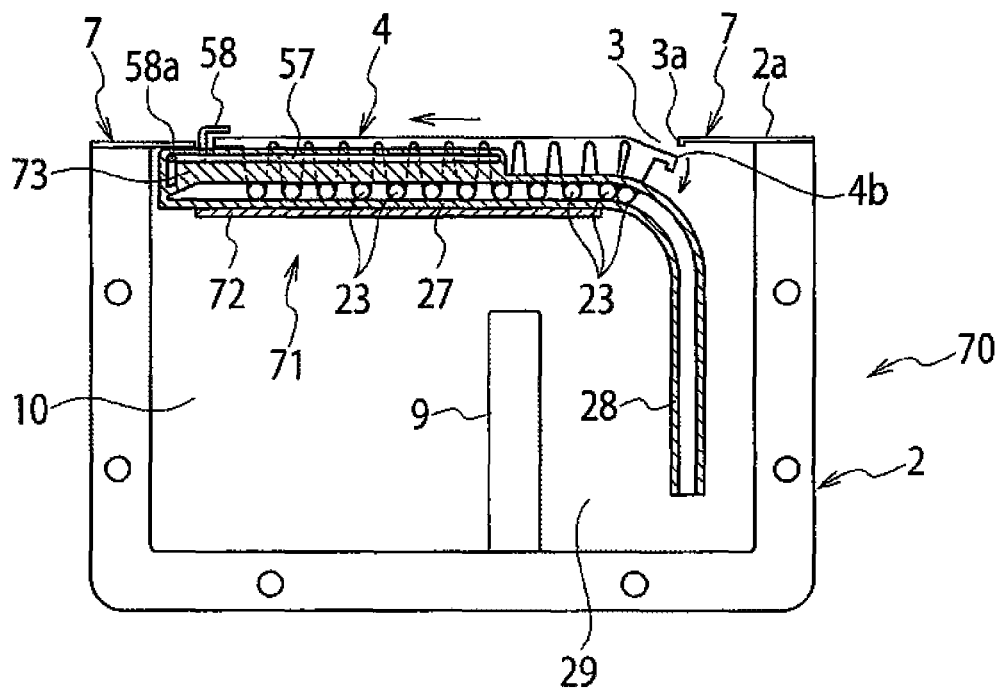
FIG. 15 is a cross-sectional view showing a state where the lid is unlocked.

As shown in FIG. 14, the box assembly 70 in the fourth embodiment includes a guide rail 71 of a guide mechanism. The guide rail 71 is composed of first rails 27 that hold the lid 4 in its close position (FIG. 14) via the guide pins 23 and second rails 28 that is integrally formed with the first rails 27 and hold the lid 4 in its open position (FIG. 16). The first rail 27 is provided on a horizontal flange 72 provided on the side panel 10. A panel 73 that slides on the flange 72 together with the first rail 27 is provided integrally with the first rail 27. A slot 57 is formed on an upper edge of the panel 73 in a longitudinal direction. A pin 58a provided on a knob 58 slides within the slot 57 to guide movement (sliding) of the knob 58.

When the knob 58 is folded down to the RR side centering about the pin 58a in the closed state (FIG. 14) of the lid 4, the panel 73 is slid slightly to the FR direction via the pin 58a. Obviously, the first rail 27 and the second rail 28 integrated with the panel 73 are also slid slightly to the FR direction. At this moment, the lid 4 itself is housed within the opening 3a and does not slide, but the most RR-side guide pins 23 are moved to a curved transition portion along with the slide of the first rail 27 and the second rail 28. As a result, the edge 4a of the lid 4 is moved downward via the guide pins 23 (FIG. 15).

Figure 16:
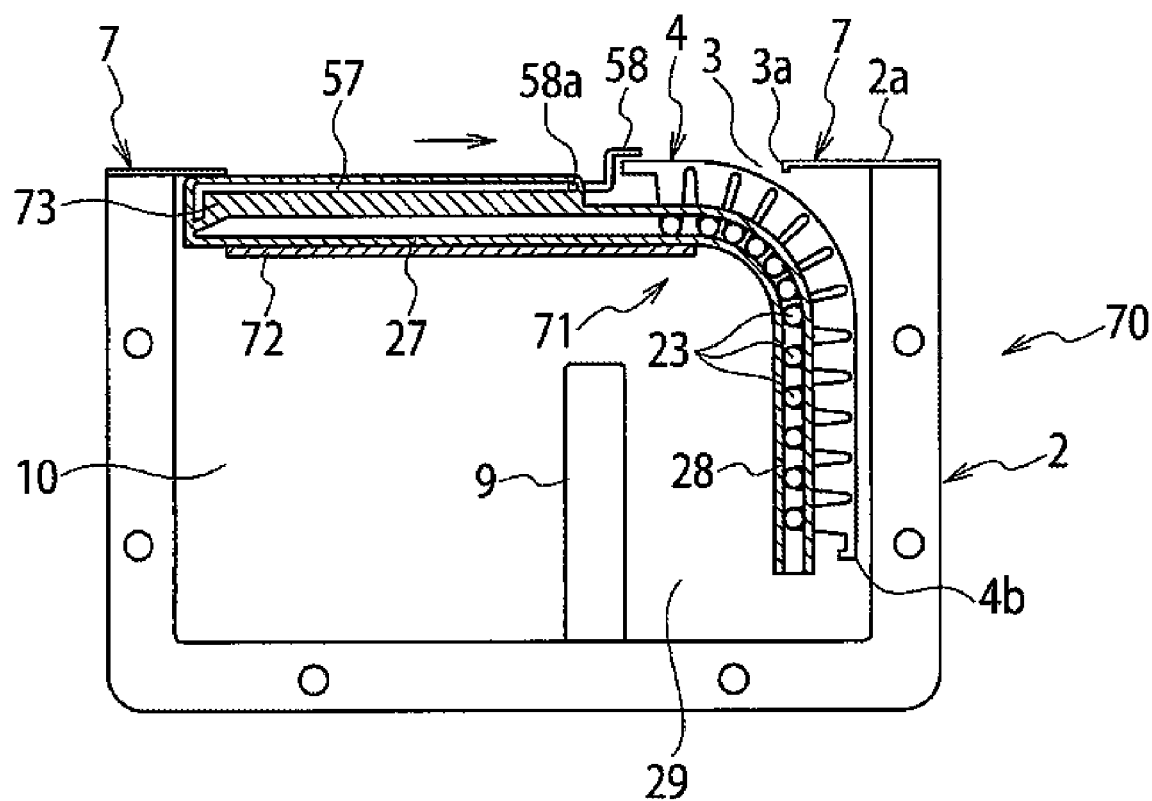
FIG. 16 is a cross-sectional view showing a state where the lid is retracted in a case.

Then, the lid 4 is slid along the first rails 27 and the second rails 28 (the guide paths) through the operation of the knob 58 to be retracted in the segmented space 29 (FIG. 16). Since the stored items do not enter the segmented space 29, the items are not affected by the slide of the lid 4 and the lid 4 can be slid unfailingly without being affected by the items. In addition, lock and unlock operations of the lid 4 can be done with the knob 58.

Fifth Embodiment

Figure 17:
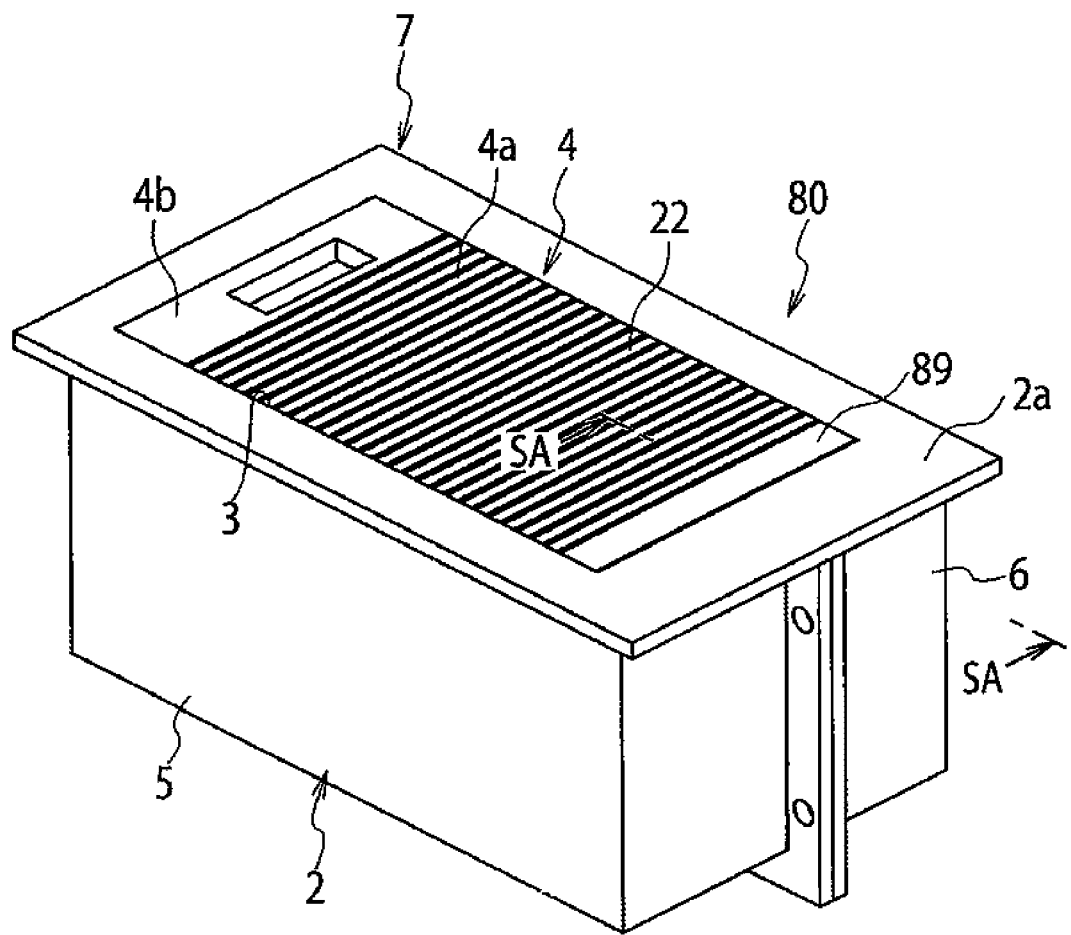
FIG. 17 is a perspective view of a storage box assembly according to a fifth embodiment when a lid is closed.

A fifth embodiment will be explained with reference to FIG. 17 to FIG. 19. A storage box assembly 80 for an automobile according to the fifth embodiment is a so-called console box and provided behind a not-shown instrument panel, on a not-shown floor, and between not-shown two seats. The console box is used for storing items (for example, music media such as CD's or MD's, tissue papers, tickets and so on) of occupants seated on the seats.

The box assembly 80 includes a case 2 in which an opening 3 is formed on its upper surface 2a, and a lid 4 that opens/closes the opening 3 of the case 2. When the lid 4 is closed as shown in FIG. 17, its surface 4a and the upper surface 2a of the case 2 substantially form a flush surface. When the lid 4 is opened, almost entire of the lid 4 is retracted in the case 2 by a guide mechanism 84. The lid 4 is retracted on a side of an opening edge 3a of the opening 3.

Figure 18:
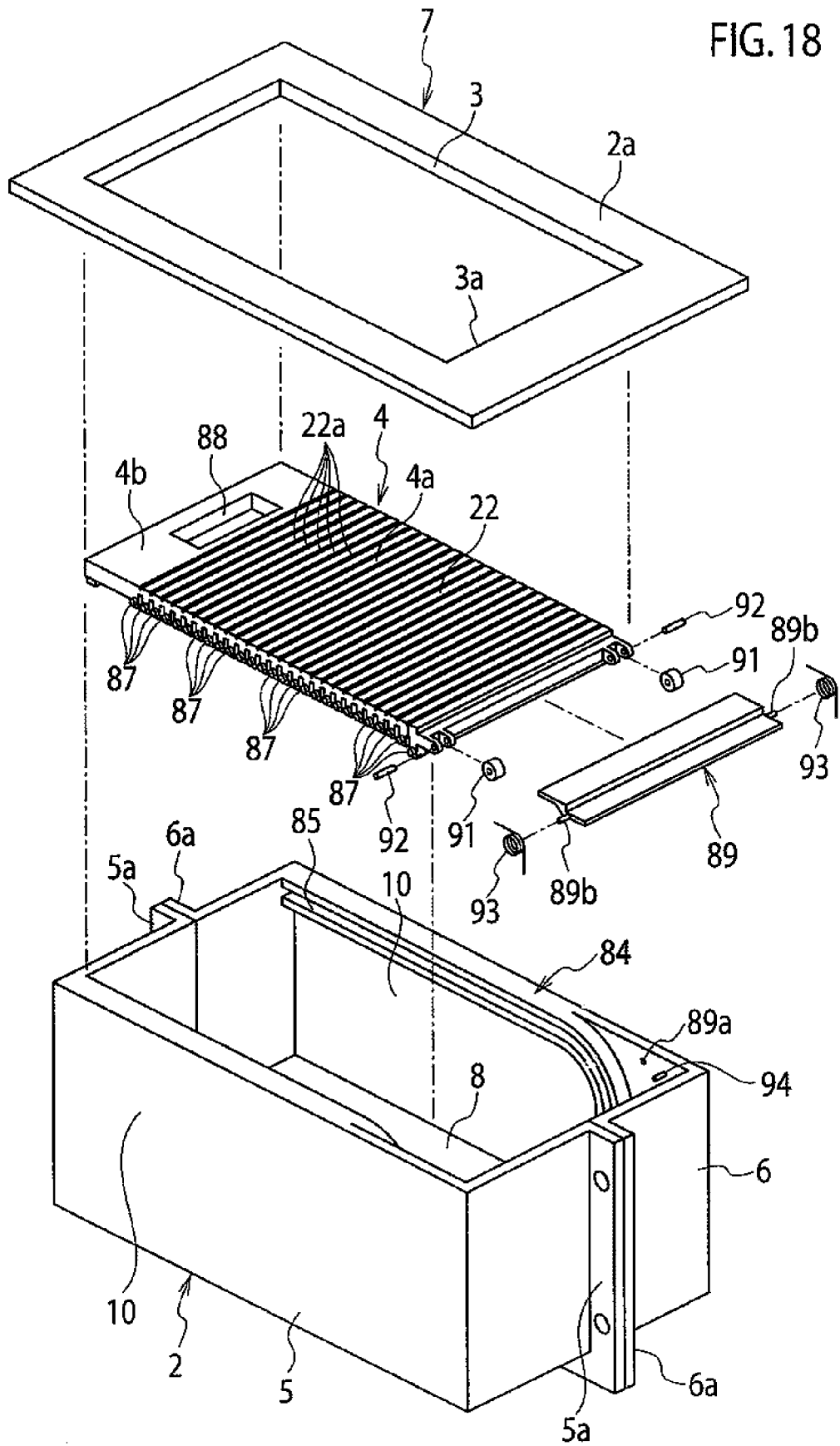
FIG. 18 is an exploded perspective view of the assembly.
Figure 19:
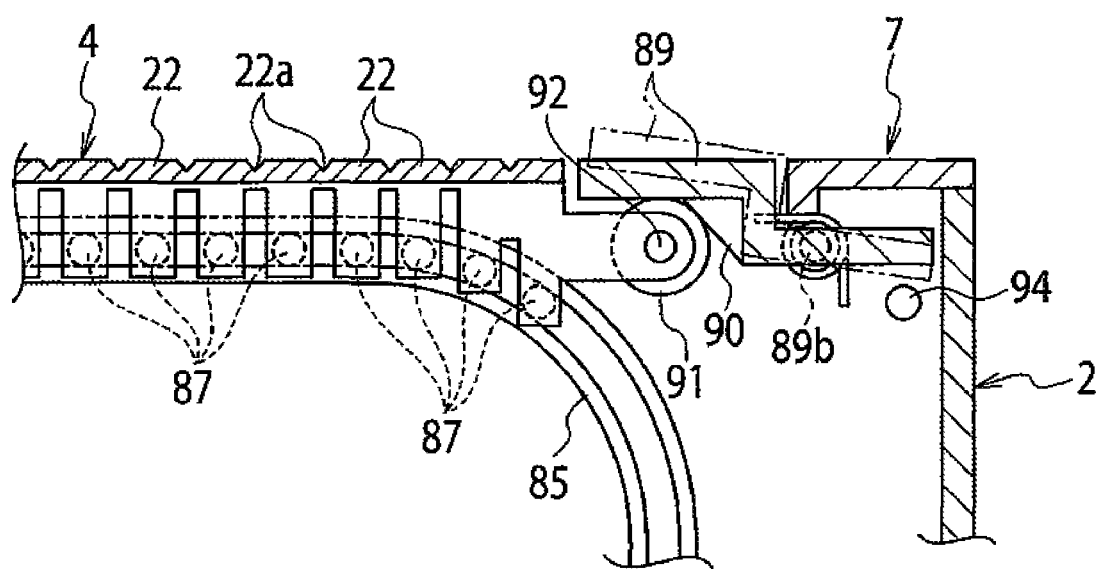
FIG. 19 is a cross-sectional view taken along a line SA-SA in FIG. 17.

As shown in FIG. 18, the case 2 is constructed by a left member 5 and a right member 6. The left member 5 and the right member 6 are combined each other at their flanges 5a and 6a. A plate 7 on which the opening 3 is formed is attached to an upper portion of the combined left and right member 5 and 6. A bottom plate 8 is formed at a lower portion of the case 2. Though the partition 9 in the above embodiments is not provided in the present embodiment, it may be provided similarly. The left member 5 and the right member 6 are formed symmetrically, and explanations with FIG. 19 are made with reference to a side of the right member 6.

Next, the guide mechanism 84 for guiding opening/closing (sliding) of the lid 4 will be explained. Components of the guide mechanism 84 are explained hereinafter. As shown in FIG. 18, the guide mechanism 84 includes guide rails 85 formed on inner surfaces of the side panels 10 and plural guide pins 87 provided on the lid 4. The guide pins 87 are formed similarly to the guide pins 23 in the first embodiment, and are slidably supported by the guide rails 85. However, in the present embodiment, some of the RR-side guide pins 87 are aligned with being curved toward the bottom plate 8 when the lid 4 is entirely closed.

In addition, the lid 4 is composed of plural lid pieces 22 aligned parallel and the above-mentioned plural guide pins 87. The plural lid pieces 22 are connected each other via hinges 22a, and the lid 4 is configured to be able to change its shape from a planar shape to a curved shape along the guide rails 85. The hinges 22a functions as elastic hinges, and are made thin so as to be easily bent in the present embodiment. The guide pins 87 are formed at both ends of each of the lid pieces 22. Each of the guide pins 87 is provided on a lower end of a tab extending downward from the ends of the lid piece 22. A pair of the guide pins 87 of each of the lid piece 22 is projected outward in a vehicle lateral direction. In the present embodiment, the twenty-seven guide pins 87 are provided at each side.

Next, a lock mechanism of the lid 4 in the present embodiment will be explained. A dummy louver 89 that has an almost Z-shaped cross-sectional shape is swingably provided at the opening edge 3a of the plate 7. Pins 89b are projected outward at both ends of the dummy louver 89. A pair of the pins 89b is inserted into a pair of holes 89a formed on the side panels 10, respectively, and the dummy louver 89 can be swing about the pair of pins 98b from a solid-line position to a dashed-line position in FIG. 19. Sloped ribs 90 are formed on a lower surface of the dummy louver 89. Rollers 91 are provided on the most RR-side lid piece 22 via pins 92. The rollers 91 can lift up the dummy louver 89 via the sloped ribs 90 along with the slide of the lid 4. Coiled torsion springs (urging members) 93 are attached to the pins 89b, and the coiled torsion springs 93 urge the dummy louver 89 to set it the solid-line position. Stoppers 94 are projected inward on the RR-side of the holes 89a on the side panels 10. The stoppers 94 restrict the swing of the dummy louver 94 at the dashed-line position. The uppermost surface of the dummy louver 94 and the upper surface 4a of the lid form a flush surface as shown in FIG. 19 when the dummy louver 94 is in the solid-line position.

When the lid 4 is opened, the lid 4 is slid along the guide mechanism 84 toward the RR side via a knob 88. At this moment, the rollers 91 lift up the sloped ribs 90 to swing the dummy louver 89 and also dive under to retract the lid 4 into the case 2. After the dummy louver 89 contacts with the stopper 94, the lid 4 is slid downward more effectively. Since the FR-side edge of the dummy louver 89 is flipped up on this occasion, a contact with the sliding lid 4 never occurs. After the rollers 90 and the sloped ribs 91 are separated away, the lid 4 is slid with being guided by the guide rails 85 via the guide pins 87.

In this manner, by swinging the dummy louver 89 when sliding the lid 4, a gap between the lid 4 and the plate 7 (the dummy louver 89) with the lid 4 closed is made smaller and thereby the appearance is improved. In addition, when the lid 4 is closed, the lid 4 is held toward the closed direction due to the elastic forces of the coiled torsion springs 93 and thereby firmly locked.

In addition, since the lid 4 is configured to be able to change its shape so as to be curved along the guide rails 85, the lid 4 can be easily retracted in the case 2.

Sixth Embodiment

A sixth embodiment will be explained with reference to FIG. 20 to FIG. 27. A storage box assembly 100 for an automobile according to the sixth embodiment is a so-called console box and provided behind a not-shown instrument panel, on a not-shown floor, and between not-shown two seats. The console box is used for storing items (for example, music media such as CD's or MD's, tissue papers, tickets and so on) of occupants seated on the seats. Hereinafter, similarly to the directions FR, RR, RH and LH, indicated are an upward direction as UP and a downward direction as LWR.

Figure 22:
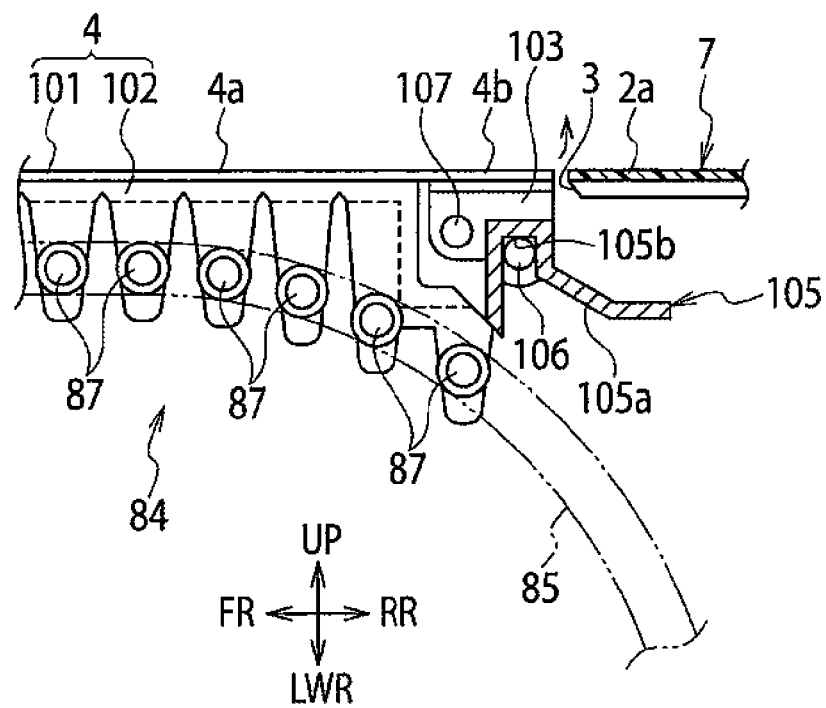
FIG. 22 is a cross-sectional view corresponding to FIG. 19.

The box assembly 100 includes a case 2 in which an opening 3 is formed on its upper surface 2a, and a lid 4 that opens/closes the opening 3 of the case 2. When the lid 4 is closed as shown in FIG. 22, its surface 4a and the upper surface 2a of the case 2 substantially form a flush surface. When the lid 4 is opened as shown in FIG. 24 to FIG. 27, almost entire of the lid 4 is retracted in the case 2 by a guide mechanism 84.

Figure 20:
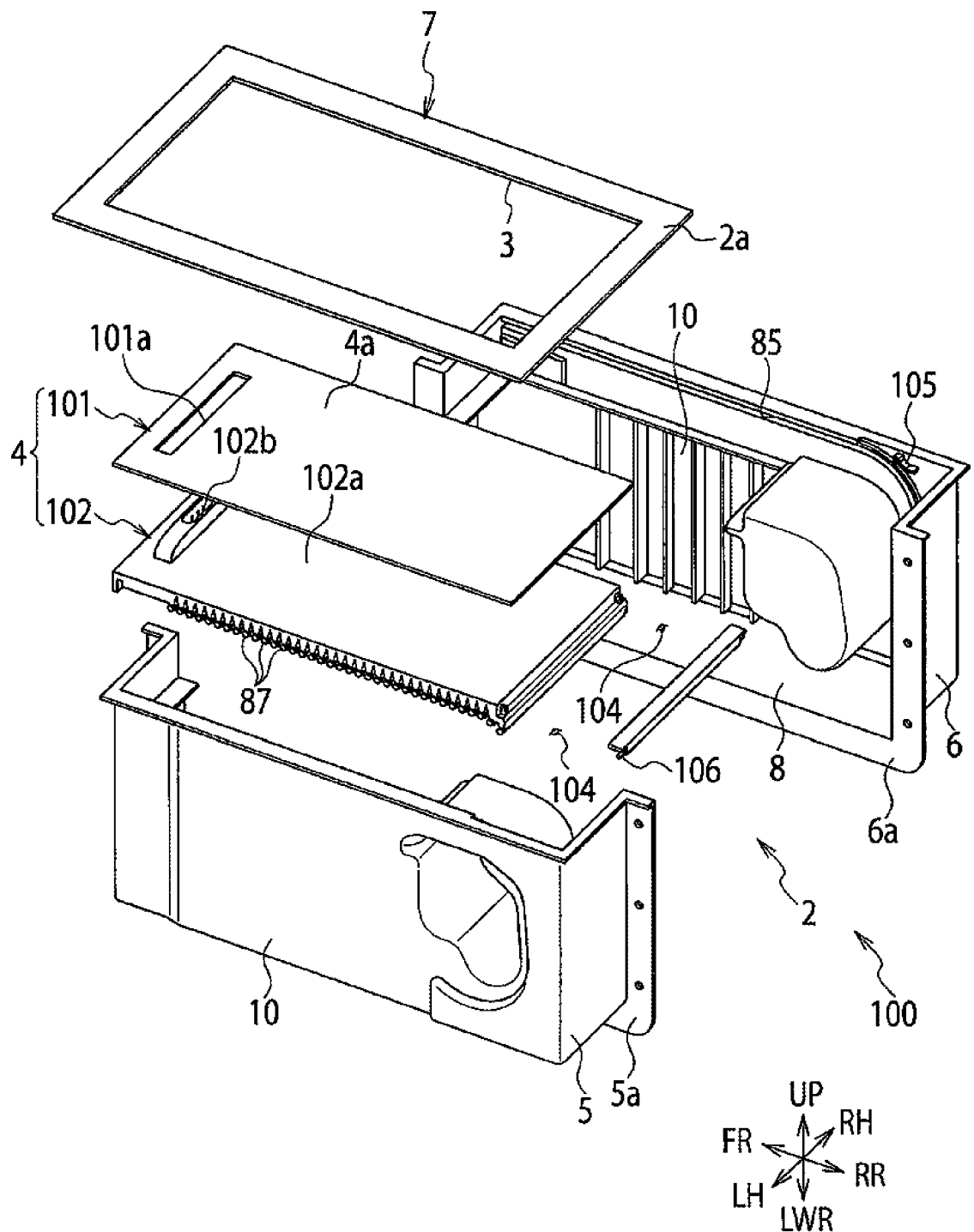
FIG. 20 is an exploded perspective view of a storage box assembly according to a sixth embodiment.

As shown in FIG. 20, the case 2 is constructed by a left member 5 and a right member 6. The left member 5 and the right member 6 are combined each other at their flanges 5a and 6a. A plate 7 on which the opening 3 is formed is attached to an upper portion of the combined left and right member 5 and 6. A bottom plate 8 is formed at a lower portion of the case 2. The left member 5 and the right member 6 are formed symmetrically, and explanations with FIG. 22 to FIG. 27 are made with reference to a side of the right member 6.

Next, the guide mechanism 84 for guiding opening/closing (sliding) of the lid 4 will be explained. Components of the guide mechanism 84 are explained hereinafter. As shown in FIG. 20, the guide mechanism 84 includes guide rails 85 formed on inner surfaces of the side panels 10 and plural guide pins 87 provided on the lid 4. The guide pins 87 are formed similarly to the guide pins 23 in the first embodiment, and are slidably supported by the guide rails 85. However, in the present embodiment, some of the RR-side guide pins 87 are aligned with being curved toward the bottom plate 8 when the lid 4 is entirely closed.

The lid 4 includes a main body 102 and a smooth outer skin 101 made of synthetic resin and affixed onto an upper surface 102a of the main body 102. The plural guide pins 87 are provided on the main body 102. The main body 102 has an almost similar structure to that in the above embodiments, and is configured to be able to change its shape from a planar shape to a curved shape along the guide rails 85. A knob 102b is formed on the main body 102. The knob 102b is projected upward from a through hole 101 of the outer skin 101, and can be operated. In the present embodiment, the thirty-six guide pins 87 are provided at each side. Also in the present embodiment, an after-mentioned lock mechanism is provided, and the lid 4 is held in its locked state (closed state) even when a longitudinal force is applied to the lid 4 due to acceleration and deceleration of the vehicle or the like. On the other hand, the lid 4 is made slidable when the locked state is released by an after-mentioned operation.

Figure 23:
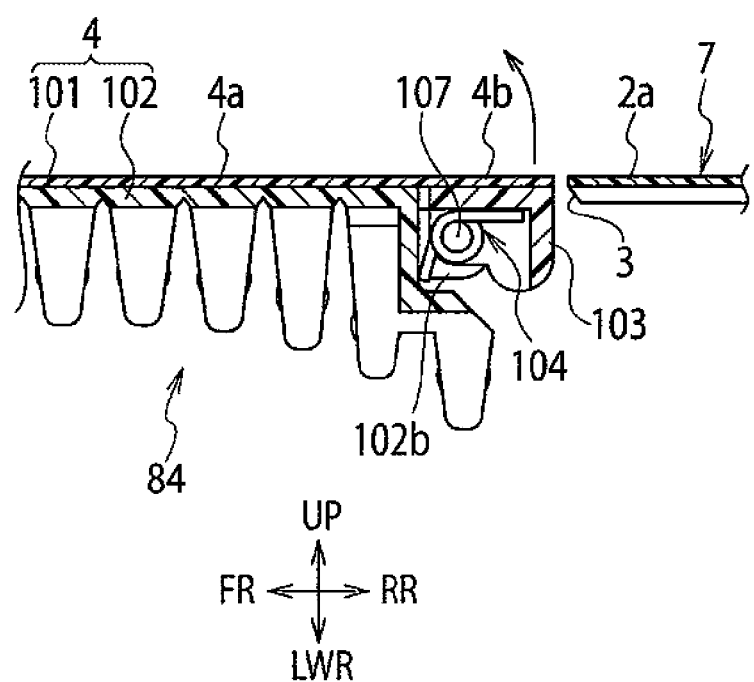
FIG. 23 is a cross-sectional view showing that a surface of the lid and an upper surface of a case substantially form a flush surface.

Next, the lock mechanism of the lid 4 in the present embodiment will be explained. As shown in FIG. 21, a unit 103 is provided at a RR-side edge of the outer skin 101 (i.e. the edge 4a of the lid 4). The unit 103 is a part of the lid on its closing side, and attached on a back surface of the outer skin 101 with glue. Cam pins 106 and swing axes 107 are provided on both ends of the unit 103. As shown in FIG. 20 and FIG. 21, the cam pins 106 are projected outward. The swing axes 107 are projected outward. The swing axes 107 are pivoted by tabs projected from RR-side both ends of the main body 102 (see FIG. 21 and FIG. 23), and the unit 103 swings about the swing axes 107. In addition, as shown in FIG. 23, coiled torsion springs (urging members) 104 are attached to the swing axes 107. As shown in FIG. 23, the coiled torsion springs 104 always urge the unit 103 in an UP direction.

Figure 24:
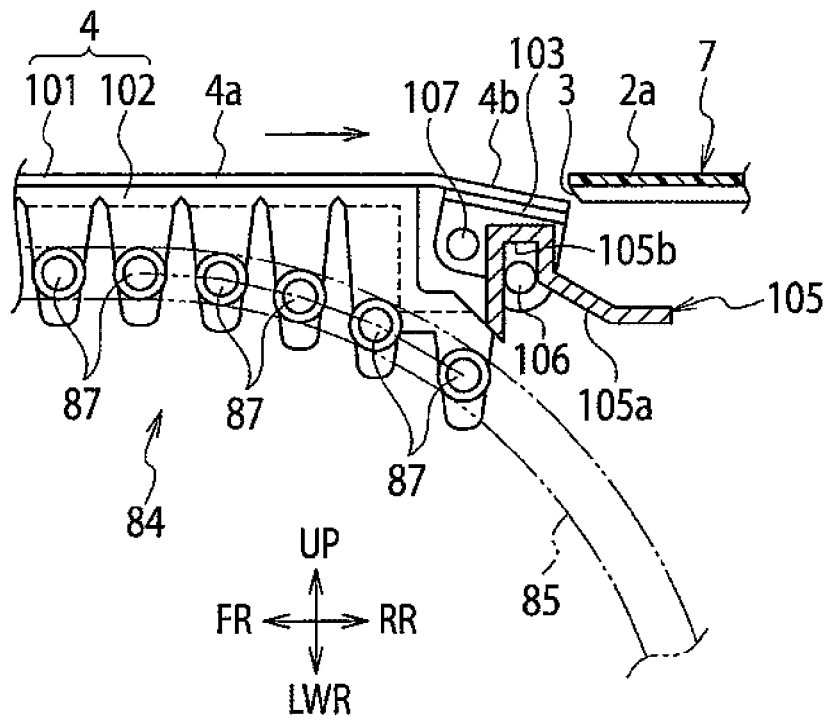
FIG. 24 is a cross-sectional view corresponding to FIG. 22 showing a state where an edge of the lid starts to disengage from a hold end of a cam flange due to opening of the lid.
Figure 25:
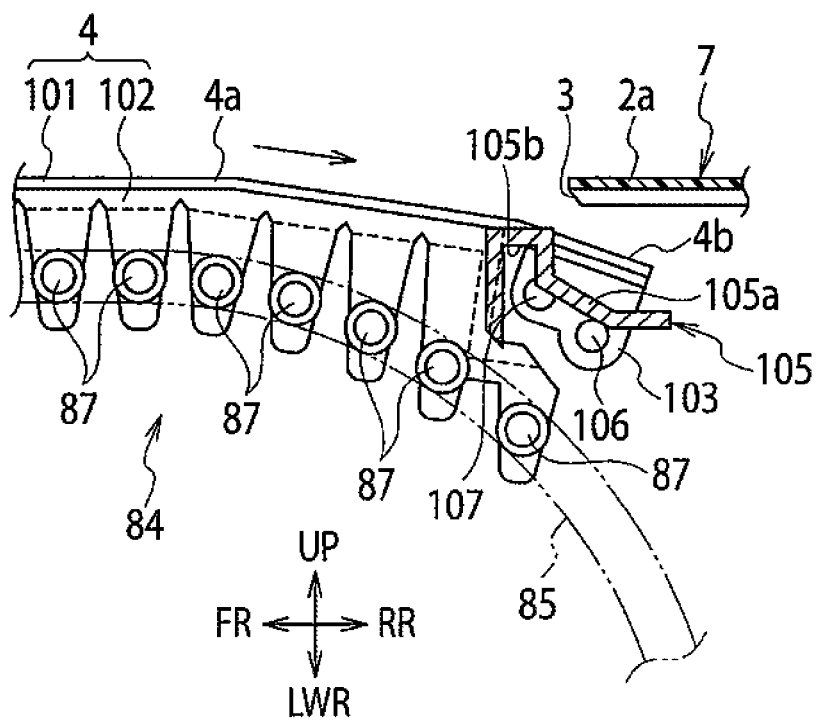
FIG. 25 is a cross-sectional view corresponding to FIG. 22 showing a state where the edge of the lid slides along an inclined guide surface of the cam flange due to further opening of the lid.
Figure 26:
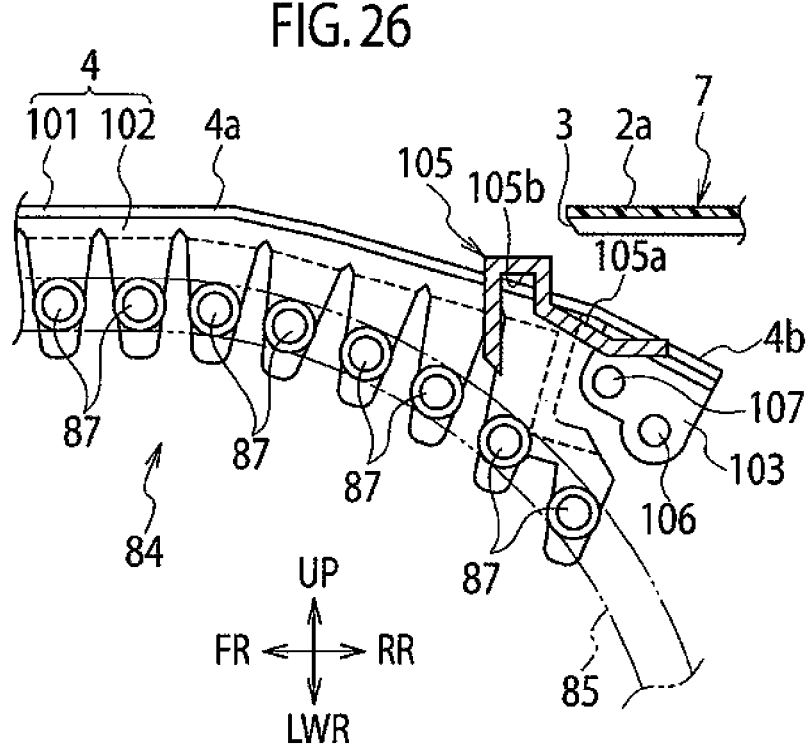
FIG. 26 is a cross-sectional view corresponding to FIG. 22 showing a state where the edge of the lid is got away from the cam flange due to further opening of the lid.
Figure 27:
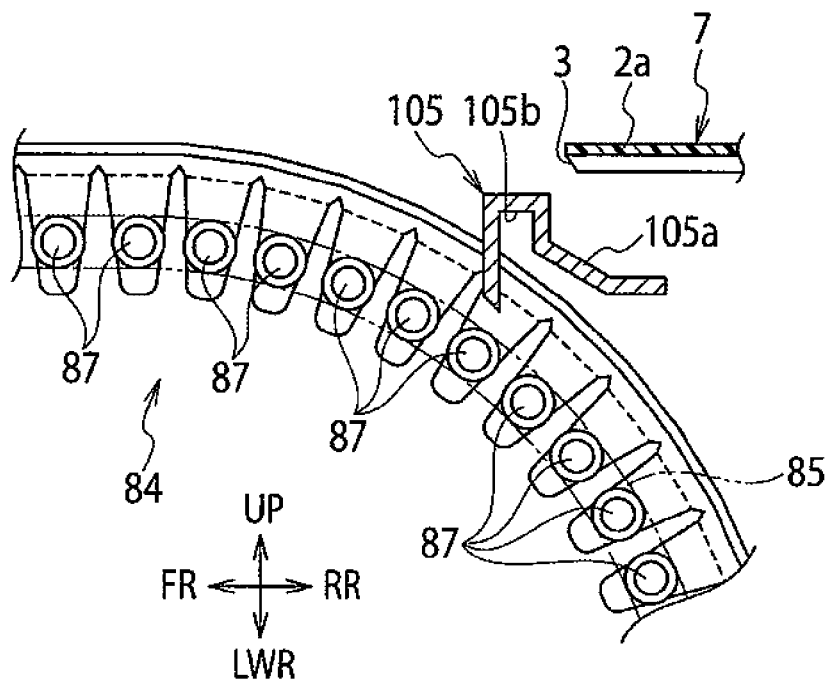
FIG. 27 is a cross-sectional view corresponding to FIG. 22 showing a state where the edge of the lid is completely got away from the cam flange due to further opening of the lid.

On the other hand, as shown in FIG. 22, cam flanges 105 projected on the side panels 10. When the lid 4 is entirely closed, the cam pins 106 are held in hold ends 105b of the cam flanges 105 due to elastic forces of the coiled torsion springs 104. The cam pins 106 are abutted to the hold ends 105b, so that the unit 103 is set at a position where entire of the upper surface 4a of the lid 4 becomes a flush surface. Since the cam pins 106 are positioned lower that the swing axes 107, the unit 103 is swung when the lid 4 is opened as shown in FIG. 24. In addition, the RR-side of the lid 4 is moved downward by the guide pins 87 and the guide rails 85. As a result, the cam pins 106 get out from the hold ends 105b and are guided by an inclined guide surface 105a as shown in FIG. 25. Therefore, it is prevented for the RR-side edge 4b to contact with the plate 7. After the cam pins 106 and the cam flanges 105 are separated away, the lid 4 is slid with being guided by the guide rails 85 via the guide pins 87 (FIG. 26 and FIG. 27).

According to the configuration of the present embodiment, the lid 4 can be retracted in the case 2 with being curved and its upper surface 4a can be a flush surface when the lid 4 is closed, and a gap between the lid 4 and the plate 7 can be made minimum. In addition, by providing the unit 103 and the cam flanges 105, the edge 4b of the lid 4 can be moved to a position with no contact with the panel 7 when the lid 4 is opened. In addition, the lid 4 is firmly locked when closed by the unit 103 and the cam flanges 105, and easily unlocked when opened only through a slide operation of the knob 102b.

In the above embodiments, the explanations are made by exemplifying the storage box assembly 1, 40, 50, 70, 80 and 100 that are installed in an automobile. However, the storage box assembly may be applied not only to automobiles but also to various vehicles such as aircrafts, ships or trains.

In addition, installation of the storage box assembly is not limited to the above embodiments, it may be built in a seat, a ceiling, a sidewall, a floor and so on.

In addition, the flat upper surface 2a of the case 2 is horizontal in the above embodiments. However, the surface 2a may take various angles until it is made vertical. For the sake of explanatory expedience, it was explained as the "upper" surface 2a.

What is claimed is:

1. A storage box assembly for a vehicle, comprising:
a case in which an opening is formed on an upper surface thereof; and
a slidable lid provided on the case for opening and closing the opening, wherein
a surface of the lid and the upper surface of the case form a flush surface in a state where the lid is fully closed,
the lid is moved to be retracted in the case by a guide mechanism when the lid is opened,
the guide mechanism includes:
a guide rail for guiding the lid in a slide direction; and
a plurality of guide pins aligned at side edges of the lid and capable of slide in the guide rail,
the lid is capable of being curved as a whole by being bent at portions between the guide pins,
a swing axis pin that functions as a swing center of a leading edge of the lid when closing the lid and a cam pin are provided at the leading edge of the lid,
an urging member that is attached to the swing axis pin and urges the leading edge of the lid for maintaining the flush surface of the lid,
a cam flange that is provided on the case and restricts or guides movement of the cam pin, and
the cam flange includes a hold end that holds the cam pin when the lid is fully closed for maintaining the flush surface of the lid, and an inclined guide surface along which the cam pin slides while the lid is opened or closed.

* * * * *